Dec. 31, 1963  G. L. PARKES ET AL  3,115,865
BIRD FEEDER ASSEMBLY
Filed May 10, 1960
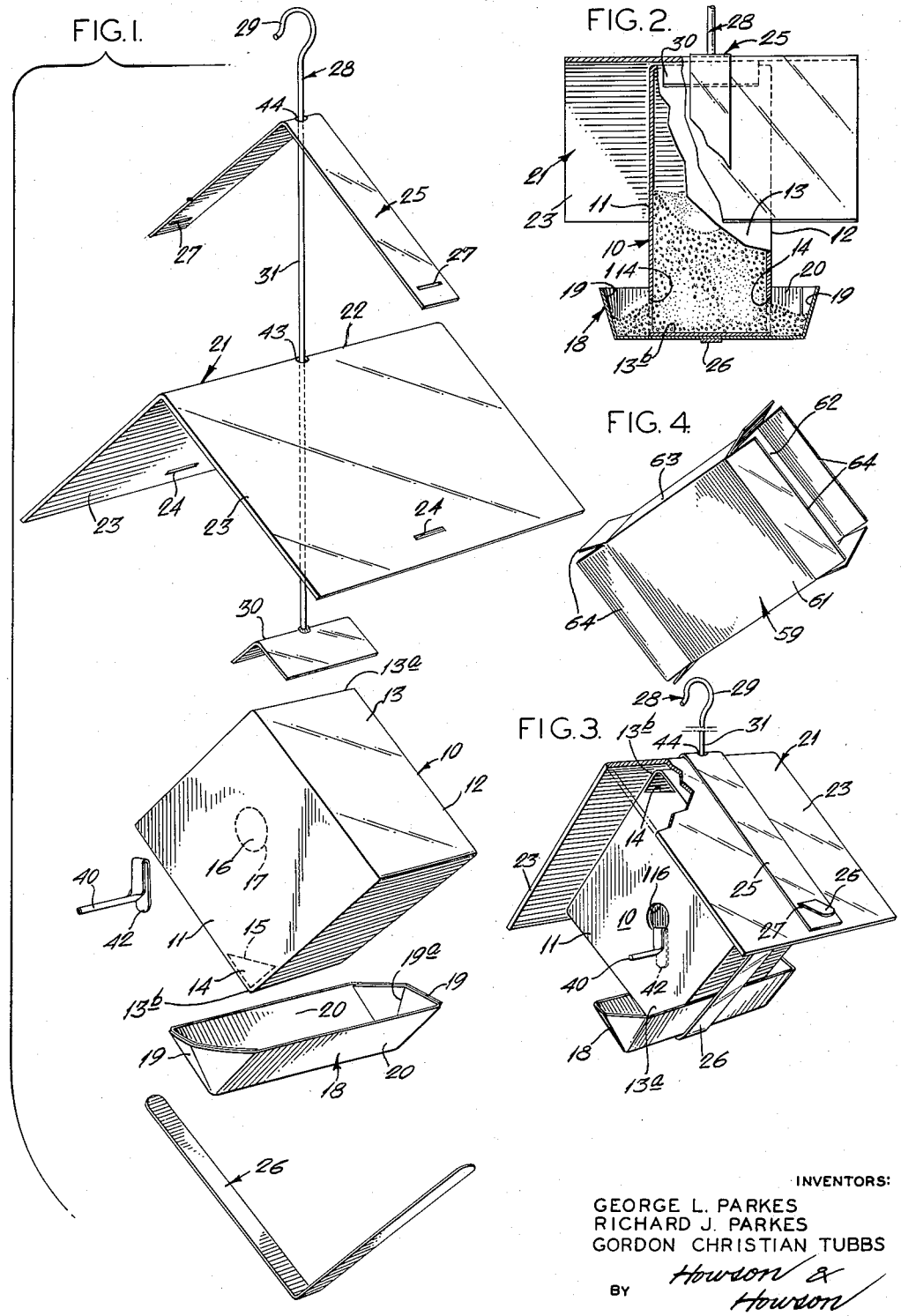
INVENTORS:
GEORGE L. PARKES
RICHARD J. PARKES
GORDON CHRISTIAN TUBBS
BY Howson & Howson
ATTYS.

United States Patent Office 3,115,865
Patented Dec. 31, 1963

3,115,865
BIRD FEEDER ASSEMBLY
George L. Parkes, Lyon Station, Pa.; Richard J. Parkes, 113 W. Main, Kutztown, Pa.; and Gordon Christian Tubbs, Sally Ann Manor, Mertztown, Pa.
Filed May 10, 1960, Ser. No. 28,143
8 Claims. (Cl. 119—52)

This invention relates to a combination bird feeder and house. More particularly the invention relates to an assembly of the above type which consists of comparatively few parts, designed and constructed so that they may be neatly arranged as a compact package and when desired be easily and quickly assembled to provide a bird feeder or bird house.

An object of the present invention is to provide an inexpensive unit of the above type composed of parts which may be easily assembled by even a child without using tools or fasteners such as screws or nails and which, when assembled is a sturdy compact structure.

More specifically the present invention provides an assembly of the above type including a carton or container for bird seed or the like which when assembled may be used as a bird feeder and which when the bird seed has been used up may serve as a bird house.

These and other objectives of the present invention and various features and details of the operation and construction thereof are hereinafter more fully set forth with reference to the accompanying drawings, in which:

FIG. 1 is an exploded perspective view of the parts comprising the assembly of the present invention;

FIG. 2 is a side elevational view drawn to a reduced scale and partially in section of the parts assembled for use as a bird feeder;

FIG. 3 is a perspective view drawn to a reduced scale of the parts assembled for use as a bird house; and FIG. 4 is a perspective view drawn to a reduced scale of a collapsible-type carton adapted to be employed as shelter portion of the bird house.

Referring now to the drawings, FIG. 1 shows the parts comprising the assembly of the present invention. The parts are suitably designed and constructed so that they may be packaged or arranged as a compact unit for shipping or storage purposes, for example, and when desired may be readily and easily assembled to form a bird feeder or bird house.

The parts of the assembly of the present invention include an enclosed carton or container 10 for bird seed or the like having spaced polygonal front and rear panels 11 and 12, respectively, and side walls 13 connecting the front and rear panels. The carton 10, in the present instance, is square and may be formed of a stiff paperboard material or the like which may be suitably waterproofed if desired, for example by wax dipping, plastic coating, or spraying. A pair of triangularly-shaped knockout portions 14 are formed by score lines 15 in front and rear panels at one corner 13b of the carton and a circularly-shaped knockout portion 16 is formed by score lines 17 centrally of the front panel 11. Removal of the knockout portions 14 provides aligned triangularly shaped openings 114 in the front and rear panels 11 and 12 and removal of the knockout portion 16 provides a circularly shaped opening 116 in the front panel 11. Other parts of the assembly include a generally V-shaped trough 18 having opposed end walls 19 foldable along a bend line 19a and side walls 20 that are approximately equal in length to an edge of the front or rear panel, and a roof 21 of generally rectangular construction bent along a fold line 22 to form opposite panel sections 23, 23 having slotted openings 24 adjacent the free outer side edges. Other parts include a pair of elongated straps 25 and 26, one of which is provided with slotted openings 27 adjacent its ends adapted to receive the other, and mounting means for rigidly suspending the assembly from a support. In the present instance, the mounting means comprises a hanger 28 which as illustrated may be a metal rod having a shaft 31 reversely bent at one end to form a hook 29 and which supports at its other end an inverted V-shaped saddle 30. The straps 25 and 26 are preferably made of a pliable metal so that they may be easily bent.

In accordance with the present invention the parts described are suitably designed so that they may be easily assembled without using any tools or fastening members such as screws or nails to provide a bird feeder having the general configuration shown in FIG. 2. This is accomplished by nesting the bottom edge 13b of the carton in the trough 18. The roof is then placed over the top of the carton so that it extends outwardly beyond the front, rear and side panels to shelter the feed in the trough and bird feeding in the trough. The parts are then secured together by placing the strap 25 crosswise of the roof so that the slots 27 in the ends thereof register with the slotted openings 24 in the roof and thereafter placing the strap 26 over the trough 14 so that it extends upwardly along the side walls 13 of the container and passes through the registering slotted openings 24 and 27 in the panels 23 and strap 25 respectively. The outer ends of the strap 26 are then bent over as shown in FIG. 3 to securely retain the roof 21, trough 18 and carton 10 in the assembled position shown in FIG. 2, with the side walls 20 of the trough and the side panels 23 of the roof flush against the side walls 13 of the carton. It is noted that the side walls 13 are completely encircled by the straps 25 and 26 to provide a metallic reinforcement about the carton. The triangularly-shaped knock-out portions 14 may then be removed to permit feed in the carton to flow gradually into the trough 14 by gravity.

Another feature of the present invention is the provision of means to suspend the assembled bird feeder from a suitable support such as the limb of a tree in a substantially rigid manner. To this end an opening 43 is provided in the roof along the fold line 22 at approximately the mid point thereof and an opening 44 at the apex of the strap 25 to receive the shaft 31 of the hanger. Prior to assembling the strap 25 and roof 21 to the carton, the hanger is threaded through the openings so that the inverted V-shaped saddle 30 nests in the fold formed at the line 22 flush against the inner surface of the roof lengthwise thereof. Accordingly, when the upper edge 13a of the carton is nested in the saddle 30, and the straps 25 and 26 are secured as illustrated in FIGS. 2 and 3, the hanger is maintained in a rigid fixed position with respect to the assembled bird feeder. The hook end of the hanger may then be firmly engaged over a limb to frictionally engage the same and provide a relatively rigid connection to thereby prevent undue movement of the feeder when it is suspended from the limb. Accordingly it may be seen that the present invention provides a bird feeder of comparatively simplified construction wherein the parts are securely maintained in place and reinforced by means of the strap members without the necessity of employing tools or fastening members.

When the feed has been used up, the assembly may be readily converted to a bird house by inverting the carton 10 so that the triangularly-shaped openings 14 are disposed adjacent the peak of the roof to provide cross-ventilation of the carton which now serves as the shelter portion of the bird house. The circularly-shaped knockout portion 16 is then removed to permit access to the interior of the carton. A perch 40 having a clip portion 42 at one end is adapted to be positioned in the circularly-shaped opening. When the assembly is used as a bird house, the trough 14 may be omitted if desired. The bird house has the same structural compactness and rigidity provided by the straps 25 and 26 as the bird feeder and also incorporates the advantages of the overhanging roof to prevent rain from entering the shelter portion and the openings adjacent the peak of the roof to provide for cross-ventilation of the shelter.

It is contemplated that the assembly may be sold as a unit including a supply of bird feed. To this end, the carton 10 is filled with seed and the other elements of the assembly are supplied with the carton as a package to be assembled by the purchaser. Accordingly, the parts are suitably designed and arranged so that they may be packaged as a compact unit. To this end the parts may be packaged together by folding the roof so that the roof panels 23 overlie one another, placing the carton 10 with either the front or rear panel adjacent the panel 23 of the roof and positioning the trough 18 along the side edge of the carton. The straps 25 and 26 may be bent so that they are generally V-shaped and positioned along side walls 13 of the carton.

Although the invention contemplates a package unit as discussed above to be sold with a container filled with bird feed, the assembly may be sold as a knocked-down kit without the feed. To provide additional compactness, another form of carton 59 which is of the collapsible type shown in FIG. 4 may suitably serve the purpose. The carton 59 as illustrated has opposed front and rear panels 61 and 62 and side walls 63, respectively, formed with end closure flaps 64 that may be folded inwardly and secured, for example, by an adhesive strip. When assembled, the carton 59 is identical in function and structure to the carton 10 and may be assembled with the other elements of the assembly in a similar manner, as described above.

The parts are pre-formed so that they may be easily assembled by even a child, without need of tools, screws or nails. The carton 59 may be arranged with the roof, straps and other parts discussed above to provide a compact kit for shipping or storing purposes. The trough 14 may be collapsed by folding the end walls outwardly along bend lines 19a so that the side walls 20 lie flat in the same plane and may be positioned over the collapsed carton 59.

Accordingly it is apparent that the present invention provides an inexpensive unit that may be easily assembled to provide a bird feeder, and may be readily converted for use as a bird house when desired. Additionally, the parts are suitably designed and constructed so that they may be conveniently arranged in a compact package form for shipping and storing purposes.

While particular embodiments of the present invention have been illustrated and described herein, it is to be understood that changes and modifications may be incorporated within the scope of the following claims.

We claim:

1. An assembly of the type described, comprising; a container having polygonal front and rear panels and side walls connecting the side edges of said front and rear panels, said side walls converging upwardly to define a top edge and converging downwardly to define a bottom edge, mounting means for said container disposing said front and rear panels vertical with said top edge uppermost and said bottom edge lowermost, a trough of triangular cross section having a length longer than the width of said side walls, said carton being nested in said trough along its bottom edge, means defining at least one knockout portion in at least one of said panels, said knockout portion being removable to provide an opening in said panel, an inverted V-shaped roof positioned over the top edge of said container extending outwardly beyond the front and rear panels and said side walls, and fastening means encircling the trough, roof and container to secure them firmly in assembled relation.

2. An assembly of the type described, comprising; a container having polygonal front and rear panels and side walls connecting the side edges of said panels, said side walls converging upwardly to define a top edge and converging downwardly to define a bottom edge, mounting means for said container disposing said front and rear panels vertical with said top edge uppermost and said bottom edge lowermost, a trough of triangular cross-section and extending outwardly beyond said front and rear panels, said carton being nested in said trough along its bottom edge, means defining knockout portions in at least one of said panels, said knockout portions being removable to provide openings in said panel, an inverted V-shaped roof positioned over the top edge of said carton extending outwardly beyond the front and rear panels and side walls, means defining openings adjacent the outer free side edges of said roof, a first elongated strap adapted to be positioned crosswise of the roof having openings in the outer ends thereof which register with said openings in the roof, and a second elongated strap adapted to embrace the trough and container along side walls thereof having its outer ends extending through said registering openings in said first strap and roof and adapted to be secured in locking relation with said first strap to secure the container, trough, and roof in the assembled relation.

3. An assembly of the type described adapted to be suspended from a support, comprising; a container having quadrangular front and rear panels and side walls connecting the side edges of said front and rear panels, said side walls convergingly upwardly to define a top edge and converging downwardly to define a bottom edge, mounting means for said container disposing said front and rear panels vertical with said top edge uppermost and said bottom edge lowermost, a trough of triangular cross-section and extending outwardly beyond said front and rear panels, said carton nested in said trough along its bottom edge, means defining knockout portions in the front and rear panels, said knockout portions being removable to provide openings in said panels, an inverted V-shaped roof positioned over the top edge of said carton extending outwardly beyond the front and rear panels and side walls, and strap means encircling said container, roof and trough to securely maintain the parts in assembled relation, said mounting means being rigid and securely connected to said assembly and adapted to be secured to said support to rigidly mount the assembly on said support.

4. A combination as claimed in claim 3, wherein said mounting means comprises a shaft reversely bent at one end to form a hook which is adapted to frictionally engage said support and an inverted V-shaped saddle mounted at the opposite end of said shaft, said saddle nesting flush against the inner surface of the roof and receiving the top edge of the carton, said saddle being maintained in said position by said strap means.

5. An assembly of the type described adapted to be suspended from a support comprising a container for bird seed or the like having quadrangular front and rear panels and side walls connecting the side edges of said front and rear panels, said side walls converging upwardly to define a top edge and converging downwardly to define a bottom edge, mounting means for said container disposing said front and rear panels vertical with said top edge uppermost and said bottom edge lowermost, a trough of triangular cross-section and extending outwardly beyond said front and rear panels, said carton being nested in said trough along its bottom edge, means defining knockout portions in the front and rear panels adjacent the bottom edge of the carton adapted to be removed to provide openings permitting seed to flow into said trough from said container, an inverted V-shaped roof positioned over the top edge of said carton extending outwardly beyond the front and rear panels, said trough and side walls, and strap means encircling the container, roof and trough to securely maintain the parts in assembled relation, said mounting being rigid and connected to said assembly and adapted to be secured to said support to rigidly mount the assembly on said support.

6. An assembly of the type described adapted to be suspended from a support comprising a one-piece container having quadrangular front and rear panels and side walls connecting the side edges of said front and rear panels, said side walls converging upwardly to define a top edge and converging downwardly to define a bottom edge, mounting means for said container disposing said front and rear panels vertical with said top edge uppermost and said bottom edge lowermost, means defining aligned openings in the front and rear panels providing ventilation openings in said carton, an inverted V-shaped roof positioned over the top edge of said carton extending outwardly beyond the front and rear panels and side walls, and strap means encircling said carton and roof to securely maintain the parts in assembled relation, said mounting means being rigid and securely connected to said assembly and adapted to be secured to said support to rigidly mount the assembly on said support.

7. An assembly as claimed in claim 6 wherein said mounting means comprises a shaft reversely bent at one end to form a hook which is adapted to frictionally engage said support and an inverted V-shaped saddle mounted at the opposite end of said shaft, said saddle nesting flush against the inner surface of said roof and receiving the top edge of the carton, said saddle being maintained in said position by said strap means.

8. An assembly of the type described adapted to be suspended from a support, comprising; a one-piece container having quadrangular front and rear panels, said side walls converging upwardly to define a top edge and converging downwardly to define a bottom edge, mounting means for said container disposing said front and rear panels vertical with said top edge uppermost and said bottom edge lowermost, an inverted V-shaped roof positioned over the top edge of said carton extending outwardly beyond the front and rear panels and side walls, means defining openings adjacent the outer free side edges of said roof, a first elongated strap adapted to be positioned cross-wise of the roof having openings in the outer ends thereof which register with said openings in the roof, and a second elongated strap adapted to embrace the container along side walls thereof having its outer ends extending through said registering openings in said first strap and roof and adapted to be secured in locking relation with said first strap to secure the container and roof in the assembled relation.

References Cited in the file of this patent

UNITED STATES PATENTS

| | | |
|---|---|---|
| 1,166,100 | White | Dec. 28, 1915 |
| 2,195,575 | Mallgraf | Apr. 2, 1940 |
| 2,230,305 | Mallgraf | Feb. 4, 1941 |
| 2,666,414 | Burr et al. | Jan. 19, 1954 |
| 2,752,032 | Fish | June 26, 1956 |
| 2,775,226 | Early | Dec. 25, 1956 |